(12) United States Patent
O'Gara et al.

(10) Patent No.: US 9,718,952 B2
(45) Date of Patent: Aug. 1, 2017

(54) SLUSH MOLDING COMPOSITION

(71) Applicant: INTEVA PRODUCTS, LLC, Troy, MI (US)

(72) Inventors: John F. O'Gara, Sterling Heights, MI (US); Srimannarayana Kakarala, Troy, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

(21) Appl. No.: 15/049,545

(22) Filed: Feb. 22, 2016

(65) Prior Publication Data

US 2017/0152378 A1 Jun. 1, 2017

Related U.S. Application Data

(63) Continuation of application No. 14/579,044, filed on Dec. 22, 2014, now Pat. No. 9,267,026.

(60) Provisional application No. 61/920,237, filed on Dec. 23, 2013.

(51) Int. Cl.
*C08L 53/00* (2006.01)

(52) U.S. Cl.
CPC ......... *C08L 53/00* (2013.01); *C08L 2205/035* (2013.01); *C08L 2207/062* (2013.01)

(58) Field of Classification Search
CPC ........................ C08L 53/00; C08L 2205/035
See application file for complete search history.

(56) References Cited

FOREIGN PATENT DOCUMENTS

| JP | 2004-002886 | * | 1/2004 |
|----|----|----|----|
| JP | 2004002886 A | | 1/2004 |
| JP | 2006199952 A | | 8/2006 |
| WO | 03066731 A1 | | 8/2003 |
| WO | WO 03/066731 A1 | * | 8/2003 |
| WO | 2007000191 A1 | | 1/2007 |
| WO | WO 2007/000191 A1 | * | 1/2007 |
| WO | 2011034776 A1 | | 3/2011 |
| WO | 2011092071 A1 | | 8/2011 |

OTHER PUBLICATIONS

Calimente et al.; "Scratch Resistance Additives"; no date; 2 pages.
Evonik Industries; "Additives for Masterbatches and Compounds"; Sep. 2010; 16 pages.
Evonik Industries; "Additives for Mastematches and Compounds" (Overview); Sep. 2010; 2 pages.
Evonik Industries; "Smart Formulating for Coatings"; Oct. 2008; 36 pages.
Ford Motor Company; "Scuffing"; BN 108-04; 2001; 3 pages.
International Search Report for International Application No. PCT/US2014/071858, International Application Filing Date Dec. 22, 2014, Date of Mailing Apr. 23, 2015; 4 pages.
IRGASURF Product Information Sheet, "Irgasurf: anti-scratch additives for PP and TPO", BASF The Chemical Company, downloaded from http://www.basf.com/group/corporate/en/brand/IRGASURF on Nov. 11, 2013, 1 page.
Lehman; "High Quality and Permanently Scratch Resistant"; Kunststoffe international; Sep. 2009; 4 pages.
Multibase; "Siloxane Masterbatch Range"; #09marcom10.V3; May 2010; 3 pages.
Wacker Silicones: Genioplast Pellet S Material Safety Data Sheet, Material 60050817, Version 1.5 (US), Date of Print: Feb. 7, 2013; Date of last aleration: Dec. 16, 2012, 9 pages.
Wacker Silicones; "Genioplast Pellet S (Polymer Additive)"; Technical data sheet for Genioplast Pellets; Version 1.3; Jun. 6, 2006; 2 pages.
Written Opinion for International Application No. PCT/US2014/071858, International Application Filing Date Dec. 22, 2014; Date of Mailing Apr. 23, 2015, 3 pages.

* cited by examiner

*Primary Examiner* — Robert Harlan
(74) *Attorney, Agent, or Firm* — Cantor Colburn LLP

(57) ABSTRACT

A thermoplastic polypropylene composition comprising polypropylene, a hydrogenated block copolymer, 3 to 6 wt % high density polyethylene, a processing oil, and greater than or equal to 3 wt % of a surface modifier comprising an ultra high molecular weight polydialkyl siloxane, an ultra-high molecular weight polydialkyl siloxane in combination with silica, a polyolefin siloxane or a combination thereof, wherein weight percent is based on the total weight of the composition.

20 Claims, 3 Drawing Sheets

Base

Example 1

Example 2

Example 3

Example 4

Example 5

Example 6        Example 7

2N  3  5  7 10N
5 Finger Scratch Test

Finger Nail Scratch Test

SLUSH MOLDING COMPOSITION

CROSS REFERENCE TO RELATED APPLICATIONS

This application is a continuation of U.S. patent application Ser. No. 14/579,044 filed on Dec. 22, 2014, which claims the benefit of U.S. Provisional Application No. 61/920,237, filed on Dec. 23, 2013, the contents of both of which are incorporated herein by reference in their entirety.

BACKGROUND

Thermoplastic polyolefin compositions are actively pursued as alternative materials for fabricated articles made of polyvinyl chloride, thermoplastic polyurethane, and/or recycled polymers. In the automotive field, thermoplastic polyolefin compositions have been used for the fabrication of articles such as interior sheathing, including instrument panel skins, door panels, air bag covers and seat covers. Many of these articles have surface appearances and designs with complex surface characteristics, such as contours and geometric technical grains.

Rotational molding processes involving a rotating mold have been found to be useful in the production of a variety of molded articles. Slush molding is a type of rotational molding wherein less than the entire interior surface of the rotating mold is heated. That is, in a slush molding process, a preheated mold is in continuous contact with a reservoir holding unheated polymer powder. As the polymer powder contacts the heated mold surface, it melts and fills all aspects of the mold. The relevant portion of the mold surface must therefore be heated to a temperature sufficient to obtain a desirable melt viscosity in the polymer to be molded.

Slush molding processes have been found to be particularly advantageous for the production of molded articles with complex surface characteristics. Ideally, a slush molding composition needs to have good melt flow (low melt viscosity at molding temperatures) as well as little or no degradation at slush molding temperatures. It is important that the surface of the molded article be capable of withstanding the wear and tear associated with use of the article. Specifically, it is essential that the molded article have robust scratch and mar properties.

There is thus a need in the art for a thermoplastic polyolefin composition having good melt flow, little or no degradation during molding and good scratch and mar properties

BRIEF DESCRIPTION

The above described and other features are exemplified by the following figures and detailed description.

In one embodiment, the disclosed composition comprises polypropylene, a hydrogenated block copolymer, 3 to 6 weight percent (wt %) high density polyethylene, 5 to 10 wt % of a processing oil, and at least 3 wt % of a surface modifier comprising an ultra-high molecular weight polydialkyl siloxane, an ultra-high molecular weight polydialkyl siloxane in combination with silica, a polyolefin siloxane or a combination thereof, wherein weight percent is based on the total weight of the composition.

BRIEF DESCRIPTION OF THE DRAWINGS

Refer now to the figures, which are exemplary embodiments, and wherein the like elements are numbered alike.

DETAILED DESCRIPTION

Figure 1:
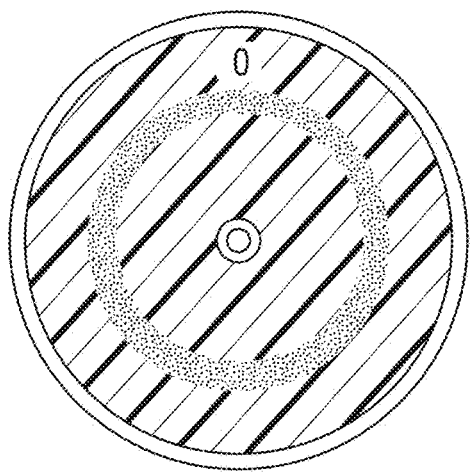
FIGS. 1-4 contains pictures which demonstrate the results of test performed on the Examples as discussed below.
Figure 1:
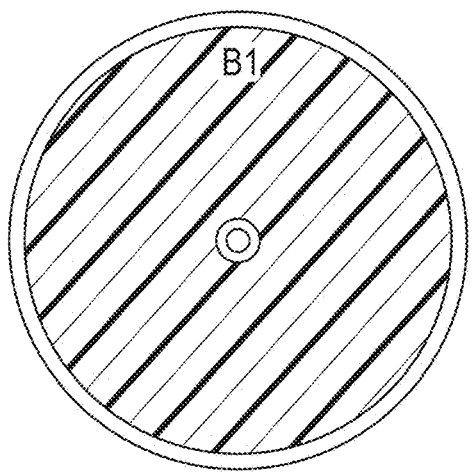
Figure 1:
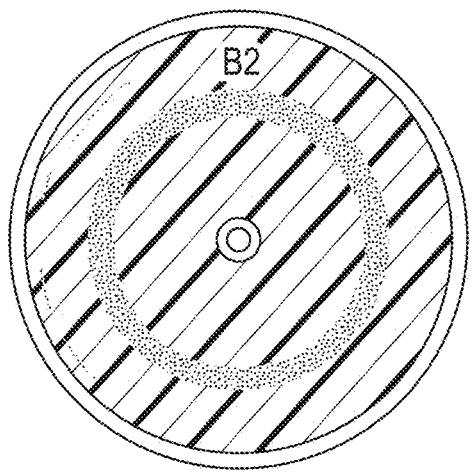
Figure 1:
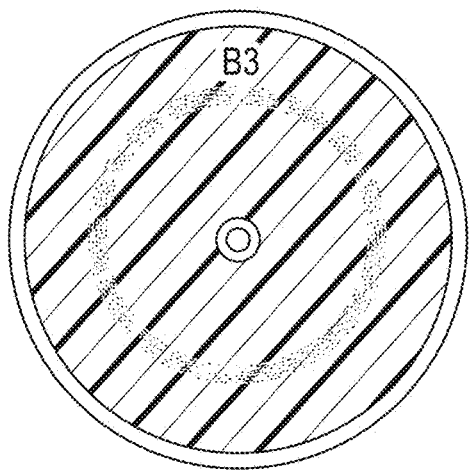
Figure 1:
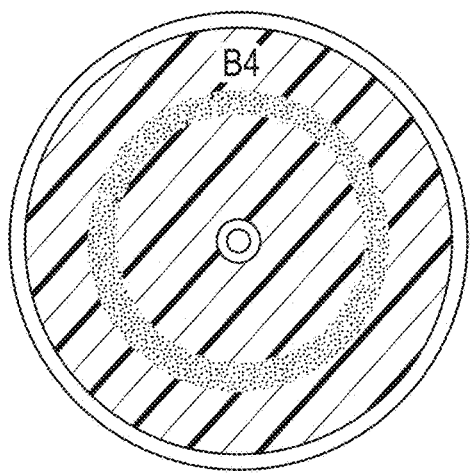
Figure 1:
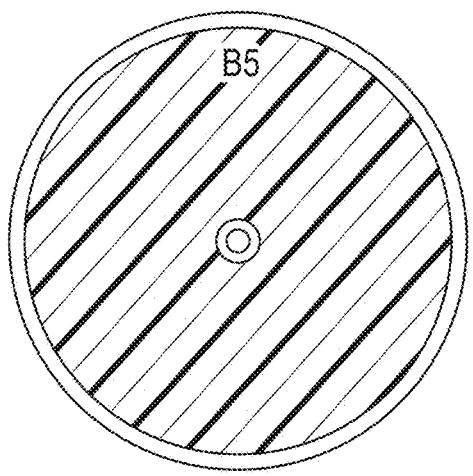

Slush molding compositions with good resistance to scratch and mar have been long sought. When surface modifying additives were first developed to address scratch and mar issues it was recognized that the scratch and mar resistance should be robust and long lived. As shown herein, scratch and mar resistance is not an automatic result of employing surface modifying additives. The effect of the surface modifying additive is specific to the thermoplastic composition and surface modifying additives that were expected to work in the thermoplastic polyolefin composition were in fact unsuccessful as further explained and described below. It was further discovered that surface modifiers alone were insufficient and high density polyethylene was required for scratch and mar resistance.

The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, or a combination of homopolymers having different melt flow rates.

In one embodiment the polypropylene comprises a crystalline polypropylene such as isotactic polypropylene. Crystalline polypropylenes are defined as polypropylenes having a crystallinity content greater than or equal to 20%, or, more specifically, greater than or equal to 25%, or, even more specifically, greater than or equal to 30%. Crystallinity may be determined by differential scanning calorimetry (DSC).

In some embodiments the polypropylene has a melting temperature greater than or equal to 134° C., or, more specifically, greater than or equal to 140° C., or, even more specifically, greater than or equal to 145° C.

The polypropylene has a melt flow rate (MFR) of 60 to 1200 grams per 10 minutes (g/10 min). Within this range the melt flow rate may be greater than or equal to 70 g/10 min. Also within this range the melt flow rate may be less than or equal to 600, or, more specifically, less than or equal to 400, or, more specifically, less than or equal to 200 g/10 min. Melt flow rate can be determined according to ASTM D1238 using either powdered or pelletized polypropylene, a load of 2.16 kilograms and a temperature of 230° C.

The thermoplastic polyolefin composition comprises 20 to 30 wt. % polypropylene based on the total weight of the composition. Within this range the amount of polypropylene can be greater than or equal to 22 wt %. Also within this range the amount of polypropylene can be less than or equal to 27 wt %, or, less than or equal to 25 wt %.

The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having branched chains.

Preferred of these structures are linear structures embracing diblock (A-B block), triblock (A-B-A block or B-A-B block), tetrablock (A-B-A-B block), and pentablock (A-B-

A-B-A block or B-A-B-A-B block) structures as well as linear structures containing 6 or more blocks in total of A and B. More preferred are diblock, triblock, and tetrablock structures, with the A-B diblock and A-B-A triblock structures being particularly preferred.

The alkenyl aromatic compound providing the block (A) is represented by formula:

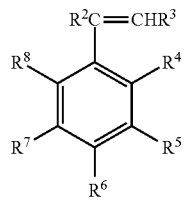

wherein R2 and R3 each independently represent a hydrogen atom, a C1-C8 alkyl group, a C2-C8 alkenyl group, or the like; R4 and R8 each independently represent a hydrogen atom, a C1-C8 alkyl group, a chlorine atom, a bromine atom, or the like; and R5-R7 each independently represent a hydrogen atom, a C1-C8 alkyl group, a C2-C8 alkenyl group, or the like, or R4 and R5 are taken together with the central aromatic ring to form a naphthyl group, or R5 and R6 are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The alkenyl aromatic content may be 1 to about 30 weight based on the total weight of the hydrogenated block copolymer. Within this range, the alkenyl aromatic content can be greater than or equal to 5 weight percent, or, greater than or equal to 10 weight percent. Also within this range, the alkenyl aromatic content can be less than or equal to 20 weight percent, or, less than or equal to 15 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight may preferably be at least about 10,000 AMU, more preferably at least about 30,000 AMU, yet more preferably at least about 45,000 AMU. Also within this range, the number average molecular weight may preferably be up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 200° C. or having no definite melting point (i.e., having non-crystallinity), as measured according to the above-described technique, are preferred. More preferably, the hydrogenated block copolymers have a melting point of at least about 0° C., yet more preferably at least about 20° C., still more preferably at least about 50° C.

The hydrogenated block copolymer may have any glass transition temperature (Tg) ascribed to the hydrogenated conjugated diene polymer chain. From the standpoint of low-temperature impact strength of the resulting resin composition, it preferably has a Tg of up to about 0° C., more preferably up to about −120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock, styrene-(ethylene-propylene) diblock, styrene-(ethylene-propylene)-styrene triblock, and styrene-(ethylene-butylene)-styrene triblock copolymers.

Suitable hydrogenated block copolymers include those commercially available as, for example, KRATON® from Kraton Polymers (formerly a division of Shell Chemical Company), and TUFTEC® from Asahi Chemical. It is explicitly contemplated that a mixture of hydrogenated block copolymers having a weight average alkenyl aromatic content of 1 to 30 weight percent based on the total weight of hydrogenated block copolymers. For example a mixture of a 30 grams of a first hydrogenated block copolymer having an alkenyl aromatic content of 50 parts by weight and 70 grams of a second hydrogenated block copolymer having an alkenyl aromatic content of 20 parts by weight would have a weight average alkenyl aromatic content of 29 as calculated by (0.3×50)+(0.7×20).

The hydrogenated block copolymer can be present in an amount of 50 to 60 weight percent, based on the total weight of the composition. Within this range the block copolymer can be present in an amount greater than or equal to 52 weight percent. Also within this range the hydrogenated block copolymer can be present in an amount less than or equal to 57 weight percent.

The high density polyethylene (HDPE) can be homo polyethylene or a polyethylene copolymer. Additionally the high density polyethylene may comprise a combination of homopolymer and copolymer, a combination of homopolymers having different melting temperatures, or a combination of homopolymers having a different melt flow rate and generally having a density of 0.941 to 0.965 g/cm3.

In some embodiments the high density polyethylene has a melting temperature greater than or equal to 124° C., or, more specifically, greater than or equal to 126° C., or, even more specifically, greater than or equal to 128° C.

The high density polyethylene has a melt flow rate (MFR) greater than or equal to 20 grams per 10 minutes and less than or equal to 40 grams per ten minutes (g/10 min). Within this range the melt flow rate may be greater than or equal to 25 g/10 min. Also within this range the melt flow rate may be less than or equal to 35 g/10 min. Melt flow rate can be determined according to ASTM D1238 using either powdered or pelletized polyethylene, a load of 2.16 kilograms and a temperature of 190° C.

The composition may comprise high density polyethylene in an amount of 3 to 6 wt %, based on the total weight of the composition. Within this range the amount of high density polyethylene may be greater than or equal to 3.5 wt %. Also within this range the amount of polyolefin may be less than or equal to 5.5 wt %.

Illustrative examples of suitable processing oils are those compatible processing oils that include hydrocarbon based oils comprising mainly paraffinic components. In one embodiment, the processing oil will be a nonaromatic processing oil.

Suitable process oils have an average molecular weight (calculated from the kinematic viscosity per ASTM D2502) in the range of about 100 to about 1000. The average molecular weight of the process oil should be selected to avoid migration from the composition in normal service use conditions. In one embodiment, the average molecular weight of the processing oil will be from 400 to 800.

Commercially available examples of suitable processing oils include Paralux processing oil and Hydrobrite processing oil, respectively commercially available from Chevron and Crompton.

Illustrative examples of processing oils include hydrocarbon based oils comprising mainly paraffinic components. The processing oil can be a nonaromatic processing oil.

Suitable process oils have an average molecular weight (calculated from the kinematic viscosity per ASTM D2502) of 100 to 1000. The average molecular weight of the process oil should be selected to avoid migration from the composition in normal service use conditions. The average molecular weight of the processing oil can be from 400 to 800.

Commercially available examples of suitable processing oils include Paralux processing oil and Hydrobrite processing oil, respectively commercially available from Chevron and Crompton.

The processing oil is present in an amount of 5 to 10 weight percent, based on the total weight of the composition. Within this range the processing oil can be present in an amount greater than or equal to 6 wt %. Also within this range the processing oil can be present in an amount less than or equal to 9 wt %.

As mentioned above surface modifiers include ultra-high molecular weight polydialkyl siloxanes such as polydimethyl siloxanes, ultra high molecular weight polydialkyl siloxanes in combination with silica, polyolefin siloxanes and combinations thereof. An ultra-high molecular weight polydialkyl siloxane has a molecular weight greater than or equal to 40,000, more specifically, greater than or equal to 100,000, more specifically greater than or equal to 200,000. The polydialkyl siloxane molecular weight can be less than or equal to 600,000. The ultra-high molecular weight polydialkyl siloxane can be included as part of a masterbatch, particularly a polyolefin masterbatch such as a polypropylene masterbatch.

The above described surface modifiers are commercially available as MB-50 from Dow Silicone, Genioplast S Pellets from Wacker Chemie, and Tegomer Antiscratch L from Evonik.

The surface modifier can be used in an amount greater than or equal to 3 weight percent, based on the total weight of the composition. The surface modifier can be present in an amount less than or equal to 10 weight percent, based on the total weight of the composition.

The composition may further comprise colorants, antioxidants, light stabilizers and the like. Typically the colorant is present in an amount less than of equal to 5 weight percent, based on the total weight of the composition. The other additives may be present in amounts less than or equal to 1 weight percent, based on the total weight of the composition.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The invention is further illustrated by the following non-limiting examples

EXAMPLES

Examples 1-7

Examples 1-7 were made using a base composition recipe as shown in Table 1.

TABLE 1

| Material/Supplier | Description | Amount (in weight percent) |
|---|---|---|
| Polypropylene AP5995-HA available from Flint Hills Resources | Polypropylene having an MFR of 100 g/10 min. | 26.3 |
| Kraton G 1643 available from Kraton Polymers | A hydrogenated block copolymer having an alkenyl aromatic content of 20%. | 43.9 |
| Kraton G 1726 | A hydrogenated block copolymer having an alkenyl aromatic content of 30%. | 17.5 |
| Color concentrate from Americhem Ebony | | 3.5 |
| B-2215 from Ciba | Heat stabilizer | 0.2 |
| Tinuvin-234 from Ciba | UV stabilizer | 0.2 |
| Uvinal 5050H from BASF | Light stabilizer | 0.2 |

TABLE 1-continued

| Material/Supplier | Description | Amount (in weight percent) |
|---|---|---|
| Cyasorb 3853S from CYTEC | Light stabilizer | 0.3 |
| Zinc stearate | | 0.4 |
| Paralux 6001R | Process Oil | 7.5 |

The base composition was combined with 5 weight percent of various surface modifiers (shown in Table 2), in some cases with 5 weight percent HDPE (also shown in Table 2) and in some cases without HDPE.

TABLE 2

| | |
|---|---|
| Genioplast Pellet S from Wacker Chemie | Ultra high molecular weight polydimethylsiloxane and silica |
| MB50-001 from Dow Silicones | Ultra high molecular weight polydimethylsiloxance masterbatch in polypropylene |
| Irgasurf SR 100B from BASF | Functionalized polysiloxane |
| Tegomer H SI 6440 from Evonik | Copolyester siloxane |
| Tegomer Antiscratch L from Evonik | Polyolefin siloxane |
| OnCap from PolyOne | Erucamide |
| ALATHON H6030 from Equistar | HDPE having a melt index of 30 g/10 min at 190° C. |

Figure 2:
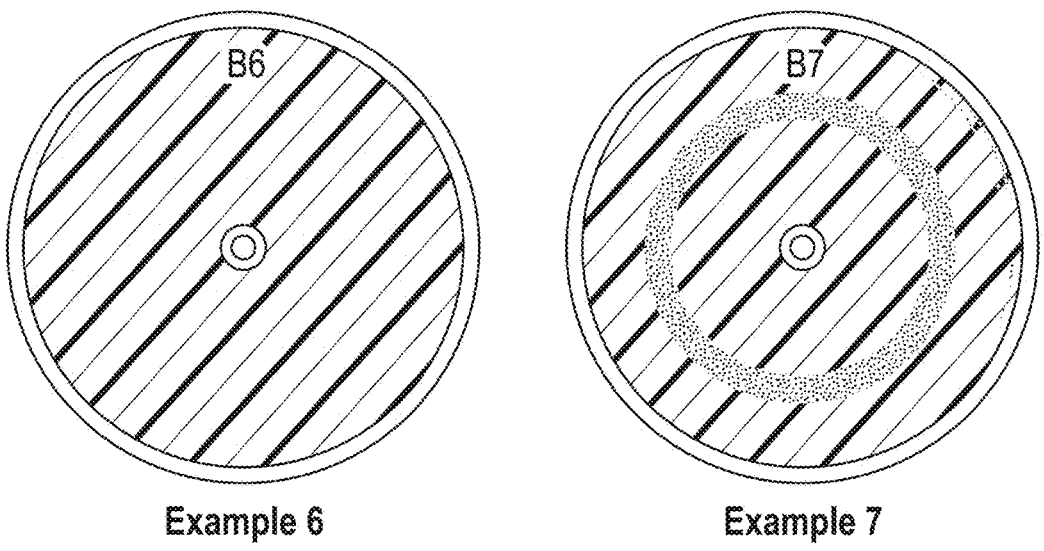

The formulations are shown in Table 3. The materials were compression molded and then evaluated for scratch and mar resistance by Ford Laboratory Test Method BN 108-04. Presence or absence of scuff marks was determined visually. A clear circular pattern was rated as a "scuff" (S), a faint circular pattern was rated as "slight scuff" (SS) and no circular pattern was rated as "no scuff" (NS). Pictures of the scuff tests are shown in FIGS. 1 and 2.

TABLE 3

| | Base* | 1 | 2* | 3* | 4* | 5 | 6 | 7* |
|---|---|---|---|---|---|---|---|---|
| Genioplast S | — | — | — | X | — | — | X | — |
| MB50 | — | X | — | — | — | — | — | — |
| Irgasurf | — | — | X | — | — | — | — | — |
| Tegomer 6440 | — | — | — | — | X | — | — | — |
| Tegomer Antiscratch L | — | — | — | — | — | X | — | — |
| OnCap | — | — | — | — | — | — | — | X |
| HDPE | — | X | X | — | X | X | X | — |
| Rating | S | NS | S | SS | S | NS | NS | S |

*Comparative Example

As can be seen from the above results, not all surface modifiers are successful in preventing scratch and mar in the thermoplastic polypropylene composition. Only ultra-high molecular weight polydialkyl siloxane or polyolefin siloxane in combination with HDPE is successful in providing scratch resistance.

Example 8

The overall formulation using Genioplast S and HDPE was reformulated. The composition is shown in Table 4. Amounts are in weight percent based on the total weight of the composition

TABLE 4

| | |
|---|---|
| Polypropylene | 23.5 |
| Kraton G 1643 | 39.1 |
| KratonG 1726 | 15.7 |
| Color concentrate | 3.1 |

TABLE 4-continued

| | |
|---|---|
| B-2215 from Ciba | 0.2 |
| Tinuvin-234 from Ciba | 0.2 |
| Uvinal 5050H from BASF | 0.2 |
| Cyasorb 3853S from CYTEC | 0.3 |
| Zinc stearate | 0.4 |
| Paralux 6001R | 8.4 |
| HDPE | 4.5 |
| Genioplast S | 4.5 |

Figure 3:
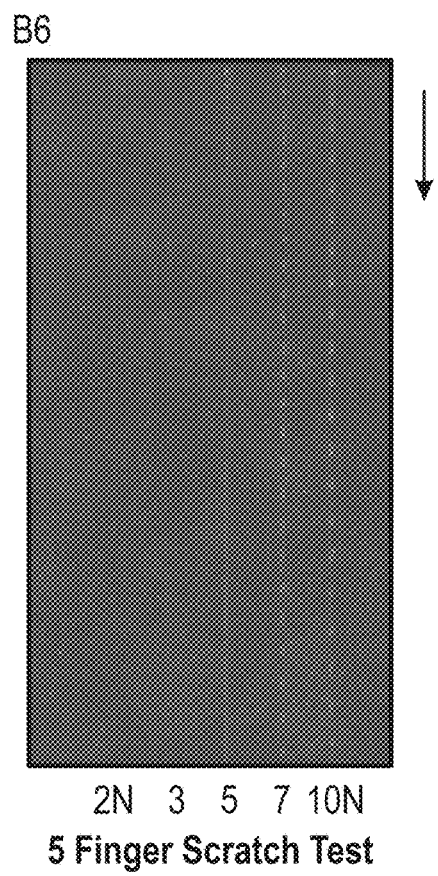
Figure 4:
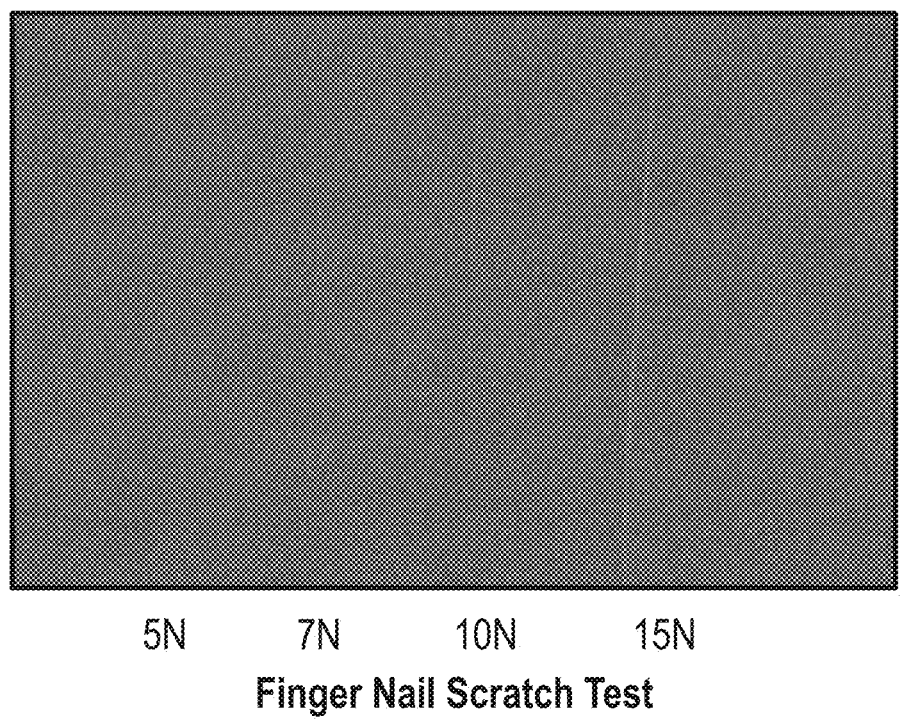

The composition was slush molded and subjected to the scuff test described above. After 250 cycles at 900 grams no marks were seen. The composition was also compression molded and tested by the 5 finger scratch test according to standard Ford protocol. This test showed no marks at 2 and 3 Newtons. Results are also shown in FIG. 3. A slush cast skin was subjected to the fingernail scratch test according to BMW method GS 97034-2 and no marking was seen until 15 Newton force was applied. Results are shown in FIG. 4.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A thermoplastic polypropylene composition comprising polypropylene, a hydrogenated block copolymer, 3 to 6 weight percent high density polyethylene, a processing oil, and greater than or equal to 3 weight percent of a surface modifier comprising an ultra-high molecular weight polydialkyl siloxane, an ultra-high molecular weight polydialkyl siloxane in combination with silica, a polyolefin siloxane or a combination thereof, wherein weight percent is based on the total weight of the composition.

2. The composition of claim 1, wherein the polypropylene comprises a copolymer.

3. The composition of claim 1, wherein the polypropylene has a melt flow rate of 60 to 1200 grams per 10 minutes as determined according to ASTM D1238 using either powdered or pelletized polypropylene, a load of 2.16 kilograms and a temperature of 230° C.

4. The composition of claim 1, wherein the polypropylene is present in an amount of 20 to 30 weight percent, based on the total weight of the composition.

5. The composition of claim 1, wherein the hydrogenated block copolymer has an alkenyl aromatic content of 1 to about 30 weight percent based on the total weight of the hydrogenated block copolymer.

6. The composition of claim 1, wherein the hydrogenated block copolymer is present in an amount of 50 to 60 weight percent, based on the total weight of the composition.

7. The composition of claim 1, wherein the surface modifier comprises an ultra-high molecular weight polydialkyl siloxane in combination with silica.

8. The composition of claim 1, wherein the hydrogenated block copolymer comprises a combination of a styrene-(ethylene-butylene)-styrene copolymer and a styrene-(ethylene-propylene)-styrene copolymer.

9. A thermoplastic polypropylene composition comprising 20 to 30 weight percent polypropylene, 50 to 60 weight percent a hydrogenated block copolymer, 3 to 6 weight percent high density polyethylene, a processing oil, and greater than or equal to 3 weight percent of a surface modifier comprising an ultra-high molecular weight polydialkyl siloxane in combination with silica, wherein weight percent is based on the total weight of the composition.

10. The composition claim 9, wherein the hydrogenated block copolymer comprises a combination of a styrene-(ethylene-butylene)-styrene copolymer and a styrene-(ethylene-propylene)-styrene copolymer.

11. A method of making an article comprising slush molding a thermoplastic polypropylene composition comprising polypropylene, a hydrogenated block copolymer, 3 to 6 weight percent high density polyethylene, a processing oil, and greater than or equal to 3 weight percent of a surface modifier comprising an ultra-high molecular weight polydialkyl siloxane, an ultra-high molecular weight polydialkyl siloxane in combination with silica, a polyolefin siloxane or a combination thereof, wherein weight percent is based on the total weight of the composition.

12. The composition of claim 11, wherein the polypropylene comprises a copolymer.

13. The composition of claim 11, wherein the polypropylene has a melt flow rate of 60 to 1200 grams per 10 minutes as determined according to ASTM D1238 using either powdered or pelletized polypropylene, a load of 2.16 kilograms and a temperature of 230° C.

14. The composition of claim 11, wherein the polypropylene is present in an amount of 20 to 30 weight percent, based on the total weight of the composition.

15. The composition of claim 11, wherein the hydrogenated block copolymer has an alkenyl aromatic content of 1 to about 30 weight percent based on the total weight of the hydrogenated block copolymer.

16. The composition of claim 11, wherein the hydrogenated block copolymer is present in an amount of 50 to 60 weight percent, based on the total weight of the composition.

17. The composition of claim 11, wherein the surface modifier comprises an ultra-high molecular weight polydialkyl siloxane in combination with silica.

18. The composition of claim 11, wherein the hydrogenated block copolymer comprises a combination of a styrene-(ethylene-butylene)-styrene copolymer and a styrene-(ethylene-propylene)-styrene copolymer.

19. The composition of claim 11, wherein the high density polyethylene comprises a homopolyethylene.

20. The composition claim 11, wherein the high density polyethylene comprises a polyethylene copolymer.

* * * * *